(12) United States Patent
Hayakawa (10) Patent No.: US 11,956,003 B2
(45) Date of Patent: Apr. 9, 2024

(54) RADIO FREQUENCY MODULE AND COMMUNICATION DEVICE

(71) Applicant: Murata Manufacturing Co., Ltd., Nagaokakyo (JP)

(72) Inventor: Masashi Hayakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 265 days.

(21) Appl. No.: 17/221,848

(22) Filed: Apr. 5, 2021

(65) Prior Publication Data

US 2021/0376873 A1  Dec. 2, 2021

(30) Foreign Application Priority Data

May 29, 2020  (JP) .................................. 2020-094567

(51) Int. Cl.
*H04B 1/40* (2015.01)
*H04B 1/04* (2006.01)

(52) U.S. Cl.
CPC ............. *H04B 1/40* (2013.01); *H04B 1/0475* (2013.01); *H04B 2001/0408* (2013.01)

(58) Field of Classification Search
None
See application file for complete search history.

(56) References Cited

U.S. PATENT DOCUMENTS

| | | | |
|---|---|---|---|
| 9,907,186 B1 * | 2/2018 | Chiu | H01L 21/4853 |
| 9,935,083 B2 * | 4/2018 | Lee | H01L 25/0657 |
| 2005/0151599 A1 * | 7/2005 | Ido | H05K 1/0243 |
| | | | 333/133 |
| 2005/0176380 A1 * | 8/2005 | Okabe | H04B 1/38 |
| | | | 455/73 |
| 2010/0253435 A1 * | 10/2010 | Ichitsubo | H01L 25/0655 |
| | | | 29/832 |
| 2011/0037170 A1 * | 2/2011 | Shinohara | H01L 21/565 |
| | | | 257/737 |
| 2015/0119102 A1 * | 4/2015 | Saji | H01L 23/5384 |
| | | | 455/550.1 |
| 2015/0181708 A1 * | 6/2015 | Ryu | H05K 1/181 |
| | | | 361/728 |
| 2016/0007463 A1 * | 1/2016 | Yoo | H01L 25/16 |
| | | | 29/841 |
| 2017/0033039 A1 * | 2/2017 | Lee | H01L 23/49833 |

FOREIGN PATENT DOCUMENTS

| | | | | |
|---|---|---|---|---|
| EP | 1693957 A1 * | 8/2006 | ............... | H03F 3/19 |
| JP | 2018-137522 A | 8/2018 | | |

* cited by examiner

*Primary Examiner* — Pablo N Tran
(74) *Attorney, Agent, or Firm* — XSENSUS LLP (57) ABSTRACT

A radio frequency module includes a signal input terminal, a signal output terminal, a low noise amplifier configured to amplify a radio frequency reception signal input from the signal input terminal, and a first filter connected between an output terminal of the low noise amplifier and the signal output terminal and having a pass band including a frequency of the radio frequency reception signal.

16 Claims, 5 Drawing Sheets

RADIO FREQUENCY MODULE AND COMMUNICATION DEVICE

CROSS-REFERENCE TO RELATED APPLICATION

The present application is based on and claims priority of Japanese Patent Application No. 2020-094567 filed on May 29, 2020. The entire disclosure of the above-identified application, including the specification, drawings and claims is incorporated herein by reference in its entirety.

BACKGROUND

1. Field of the Disclosure

The present disclosure relates to a radio frequency module and a communication device.

2. Description of the Related Art

A mobile communication device such as a mobile phone has a low noise amplifier that amplifies a radio frequency reception signal. In Japanese Unexamined Patent Application Publication No. 2018-137522, a front-end circuit (a radio frequency (RF) module) is disclosed that includes a power amplification (PA) circuit (a transmission amplification circuit) for transferring a transmission signal and a low noise amplification (LNA) circuit (a reception amplification circuit) for transferring a reception signal. In the reception amplification circuit, a filter and an LNA controller are arranged. The filter is connected to an input-terminal side of the low noise amplifier, and the LNA controller controls amplification characteristics of the low noise amplifier.

In the reception amplification circuit of Japanese Unexamined Patent Application Publication No. 2018-137522, a filter for ensuring attenuation near the pass band is arranged before the low noise amplifier in order to reduce signal distortion in the low noise amplifier.

Signal distortion is suppressed by the filter arranged before the low noise amplifier; however, it may be possible that the required performance indicated by a noise factor cannot be satisfied because of the filter.

SUMMARY

The present disclosure has been made to solve the above-described issue, and one object of the present disclosure is to provide a radio frequency module and a communication device that include a reception amplification circuit having a favorable noise factor.

A radio frequency module according to preferred embodiments of the present disclosure includes a signal input terminal, a signal output terminal, a low noise amplifier configured to amplify a radio frequency reception signal input from the signal input terminal, and a first filter connected between an output terminal of the low noise amplifier and the signal output terminal and having a pass band including a frequency of the radio frequency reception signal.

Other features, elements, characteristics and advantages of the present disclosure will become more apparent from the following detailed description of preferred embodiments of the present disclosure with reference to the attached drawings.

DETAILED DESCRIPTION

In the following, embodiments of the present disclosure will be described in detail. Note that the embodiments, which are to be described below, illustrate general or specific examples. Numerical values, shapes, materials, structural elements, and arrangement and connections of the structural elements illustrated in the following embodiment and Examples 1 and 2 are examples, and are not intended to limit the present disclosure. Among the structural elements in the following embodiment and Examples 1 and 2, structural elements that are not described in independent claims will be described as optional structural elements. In addition, the structural elements in the drawings are not strictly illustrated in terms of size or size ratio. In the drawings, configurations that are substantially the same are denoted by the same reference numerals, and redundant description may be omitted or simplified.

In the following, terms indicating relationships between elements such as "parallel" and "perpendicular" and terms indicating the shapes of elements such as "rectangular", and numerical ranges are not intended to provide only definite meanings but are intended to cover substantially the same relationships, shapes, and numerical ranges that include differences, for example, on the order of a few percent.

In the following, regarding A, B, and C mounted on a board, "in a case where the board (or a main surface of the board) is viewed in a plan view, C is arranged between A and B" means that when the board is viewed in a plan view, at least one of a plurality of line segments connecting arbitrary points in A to arbitrary points in B passes through the region of C. In addition, viewing of the board in a plan view means that the board and circuit elements mounted on the board are orthogonally projected onto a surface substantially parallel to the main surface of the board and are viewed.

In the following, "transmission path" indicates a transmission line including, for example, a wiring line through which a radio frequency transmission signal propagates, an electrode directly connected to the wiring line, and a terminal directly connected to the wiring line or the electrode. Moreover, "reception path" indicates a transmission line including, for example, a wiring line through which a radio frequency reception signal propagates, an electrode directly connected to the wiring line, and a terminal directly connected to the wiring line or the electrode. Moreover, "transmission-reception path" indicates a transmission line including, for example, wiring lines through which a radio frequency transmission signal and a radio frequency reception signal propagate, electrodes directly connected to the wiring lines, and terminals directly connected to the wiring lines or the electrodes.

Embodiment

1. Circuit Configuration of Radio Frequency Module 1 and Communication Device 4

Figure 1:
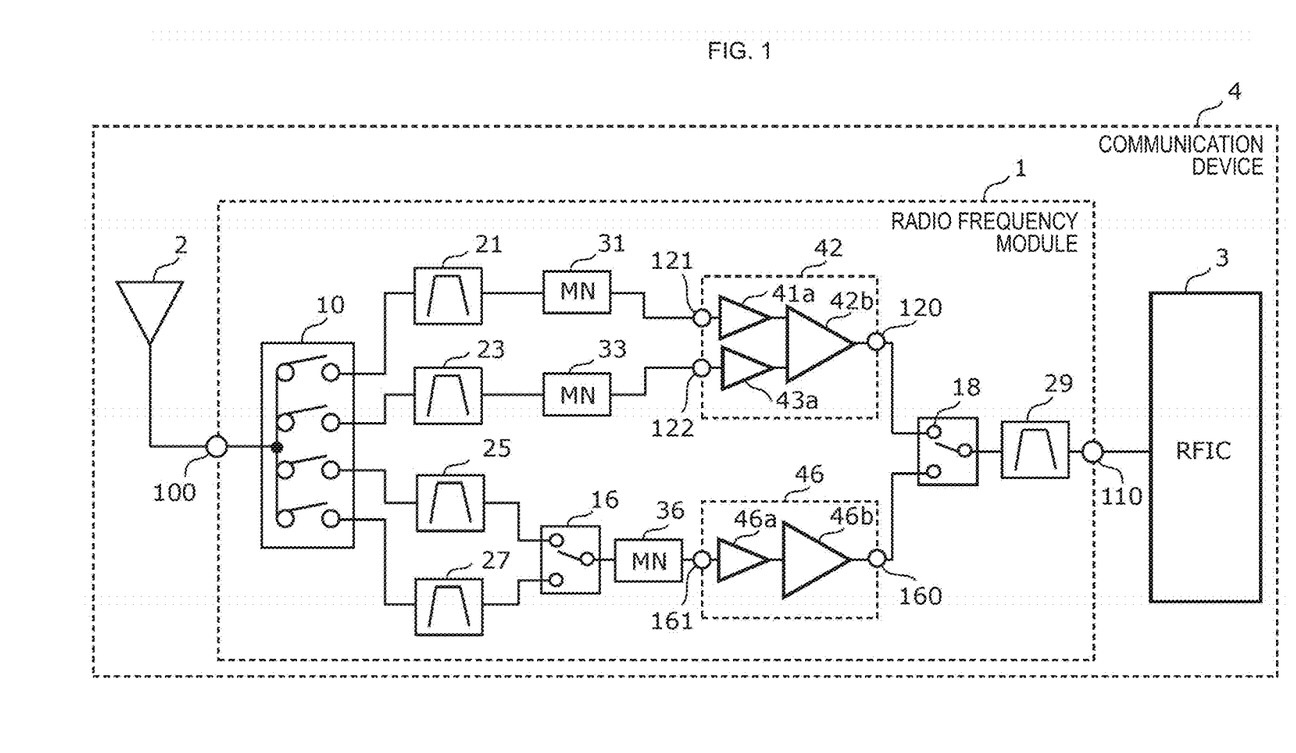
FIG. 1 is a circuit configuration diagram of a radio frequency module and a communication device according to an embodiment.

FIG. 1 is a circuit configuration diagram of a radio frequency module 1 and a communication device 4 according to an embodiment. As illustrated in FIG. 1, the communication device 4 includes the radio frequency module 1, an antenna 2, and a radio frequency (RF) signal processing circuit (RFIC) 3.

The RFIC 3 is an RF signal processing circuit that processes radio frequency signals to be transmitted and received by the antenna 2. Specifically, the RFIC 3 performs signal processing such as down-conversion on a reception signal input through a reception path of the radio frequency module 1, and outputs the reception signal generated by performing the signal processing to a baseband signal processing circuit (not illustrated). Moreover, the RFIC 3 can perform signal processing such as up-conversion on a transmission signal input from the baseband signal processing circuit, and output the transmission signal generated by performing the signal processing to a transmission path (not illustrated) of the radio frequency module 1.

The RFIC 3 also has a function as a controller that controls connection of switches 10, 16, and 18 of the radio frequency module 1 on the basis of a communication band (frequency band) used. The RFIC 3 also has a function as a controller that controls the gain of low noise amplifiers 42 and 46 of the radio frequency module 1 and a power supply voltage Vcc and a bias voltage Vbias that are to be supplied to the low noise amplifiers 42 and 46. Note that the controller may be provided outside the RFIC 3.

The antenna 2 is connected to an antenna connection terminal 100 of the radio frequency module 1, and receives a radio frequency signal from the outside and outputs the radio frequency signal to the radio frequency module 1.

Next, a detailed configuration of the radio frequency module 1 will be described.

As illustrated in FIG. 1, the radio frequency module 1 includes the antenna connection terminal 100, a reception output terminal 110, the low noise amplifiers 42 and 46, filters 21, 23, 25, 27, and 29, matching circuits 31, 33, and 36, and the switches 10, 16, and 18.

The antenna connection terminal 100 is an example of a signal input terminal through which a radio frequency reception signal is input to the radio frequency module 1, and is connected to the antenna 2. The reception output terminal 110 is an example of a signal output terminal through which a radio frequency reception signal is output from the radio frequency module 1, and is connected to the RFIC 3.

The low noise amplifier 42 has input terminals 121 and 122, an output terminal 120, first-stage amplification elements 41a and 43a, and a subsequent-stage amplification element 42b. An input terminal of the first-stage amplification element 41a is connected to the input terminal 121, and an output terminal of the first-stage amplification element 41a is connected to a first input terminal of the subsequent-stage amplification element 42b. An input terminal of the first-stage amplification element 43a is connected to the input terminal 122, and an output terminal of the first-stage amplification element 43a is connected to a second input terminal of the subsequent-stage amplification element 42b. An output terminal of the subsequent-stage amplification element 42b is connected to the output terminal 120.

With the connection structure described above, a cascading connection circuit including the first-stage amplification element 41a and the subsequent-stage amplification element 42b can amplify, with low noise, radio frequency signals of a communication band A. Moreover, a cascading connection circuit including the first-stage amplification element 43a and the subsequent-stage amplification element 42b can amplify, with low noise, radio frequency signals of a communication band B.

The low noise amplifier 46 has an input terminal 161, an output terminal 160, a first-stage amplification element 46a, and a subsequent-stage amplification element 46b. An input terminal of the first-stage amplification element 46a is connected to the input terminal 161, and an output terminal of the first-stage amplification element 46a is connected to an input terminal of the subsequent-stage amplification element 46b. An output terminal of the subsequent-stage amplification element 46b is connected to the output terminal 160.

With the connection structure described above, a cascading connection circuit including the first-stage amplification element 46a and the subsequent-stage amplification element 46b can amplify, with low noise, radio frequency signals of a communication band C and a communication band D.

Each of the low noise amplifiers 42 and 46 may be formed in a semiconductor integrated circuit (IC). The semiconductor IC is formed using, for example, complementary metal oxide semiconductor (CMOS). Specifically, the semiconductor IC is formed by a silicon on insulator (SOI) process. This makes it possible to manufacture the semiconductor IC at low cost. Note that the semiconductor IC may include at least one out of GaAs, SiGe, and GaN. This makes it possible to output a radio frequency signal with which high-quality amplification performance and noise performance can be achieved.

The filter 21 is an example of a second filter and is connected between the antenna connection terminal 100 and the input terminal 121. The filter 21 allows, among reception signals input from the antenna connection terminal 100, reception signals of a reception band of the communication band A to pass therethrough. That is, the filter 21 treats, as a pass band, the reception band of the communication band A.

The filter 23 is an example of the second filter and is connected between the antenna connection terminal 100 and the input terminal 122. The filter 23 allows, among reception signals input from the antenna connection terminal 100, reception signals of a reception band of the communication band B to pass therethrough. That is, the filter 23 treats, as a pass band, the reception band of the communication band B.

Because of the arrangement of the filters 21 and 23, signal distortion caused at the low noise amplifier 42 can be suppressed.

The filter 25 is an example of the second filter and is connected between the antenna connection terminal 100 and the input terminal 161. The filter 25 allows, among reception signals input from the antenna connection terminal 100, reception signals of a reception band of the communication band C to pass therethrough. That is, the filter 25 treats, as a pass band, the reception band of the communication band C.

The filter 27 is an example of the second filter and is connected between the antenna connection terminal 100 and the input terminal 161. The filter 27 allows, among reception signals input from the antenna connection terminal 100, reception signals of a reception band of the communication band D to pass therethrough. That is, the filter 27 treats, as a pass band, the reception band of the communication band D.

Because of the arrangement of the filters 25 and 27, signal distortion caused at the low noise amplifier 46 can be suppressed.

The filter 29 is an example of a first filter and is connected between the output terminal 120 of the low noise amplifier 42 and the reception output terminal 110 and between the output terminal 160 of the low noise amplifier 46 and the reception output terminal 110. More specifically, the filter 29 is connected between the output terminal of the subsequent-stage amplification element 42b and the reception output terminal 110, the subsequent-stage amplification element 42b being arranged in the last stage out of the first-stage amplification elements 41a and 43a and the subsequent-stage amplification element 42b included in the low noise amplifier 42. Moreover, the filter 29 is connected between the output terminal of the subsequent-stage amplification element 46b and the reception output terminal 110, the subsequent-stage amplification element 46b being arranged in the latter stage out of the first-stage amplification element 46a and the subsequent-stage amplification element 46b included in the low noise amplifier 46. The filter 29 treats, as a pass band, a frequency band including the communication bands A, B, C, and D.

Note that in a case where the radio frequency module 1 includes a transmission circuit, each of the filters 21, 23, 25, and 27 may form a duplexer together with a transmission filter.

Note that each of the filters 21, 23, 25, 27, and 29 may be, for example, one out of an acoustic wave filter using surface acoustic waves (SAWs), an acoustic wave filter using bulk acoustic waves (BAWs), an inductance-capacitance (LC) resonant filter, and a dielectric filter, and furthermore is not limited thereto.

The matching circuit 31 is connected between the filter 21 and the input terminal 121 of the low noise amplifier 42, and achieves impedance matching between the filter 21 and the low noise amplifier 42.

The matching circuit 33 is connected between the filter 23 and the input terminal 122 of the low noise amplifier 42, and achieves impedance matching between the filter 23 and the low noise amplifier 42.

The matching circuit 36 is connected between the filter 25 and the input terminal 161 of the low noise amplifier 46 and between the filter 27 and the input terminal 161 of the low noise amplifier 46, and achieves impedance matching for the filters 25 and 27 and the low noise amplifier 46.

Each of the matching circuits 31, 33, and 36 includes at least one out of an inductor and a capacitor.

The switch 10 is an example of an antenna switch and is connected to the antenna connection terminal 100. The switch 10 switches between (1) connection and non-connection of the antenna connection terminal 100 to the filter 21, (2) connection and non-connection of the antenna connection terminal 100 to the filter 23, (3) connection and non-connection of the antenna connection terminal 100 to the filter 25, and (4) connection and non-connection of the antenna connection terminal 100 to the filter 27. Note that the switch 10 may be formed as a multiple-connection type switch circuit capable of establishing at least two connections among (1) to (4) described above.

The switch 16 has a common terminal and two selection terminals. The common terminal is connected to the matching circuit 36, one of the selection terminals is connected to the filter 25, and the other selection terminal is connected to the filter 27. In this connection structure, the switch 16 switches between connection of the low noise amplifier 46 to the filter 25 and connection of the low noise amplifier 46 to the filter 27. The switch 16 may be formed by, for example, a single-pole double-throw (SPDT) switch circuit.

The switch 18 has a common terminal and two selection terminals. The common terminal is connected to the filter 29, one of the selection terminals is connected to the low noise amplifier 42, and the other selection terminal is connected to the low noise amplifier 46. In this connection structure, the switch 18 switches between connection of the low noise amplifier 42 to the filter 29 and connection of the low noise amplifier 46 to the filter 29. The switch 18 may be formed by, for example, an SPDT switch circuit.

In the configuration of the radio frequency module 1, the switch 10, the filter 21, the matching circuit 31, the low noise amplifier 42, the switch 18, and the filter 29 form a first reception circuit that transfers a reception signal of the communication band A from the antenna 2 through the antenna connection terminal 100.

Moreover, the switch 10, the filter 23, the matching circuit 33, the low noise amplifier 42, the switch 18, and the filter 29 form a second reception circuit that transfers a reception signal of the communication band B from the antenna 2 through the antenna connection terminal 100.

Moreover, the switch 10, the filter 25, the switch 16, the matching circuit 36, the low noise amplifier 46, the switch 18, and the filter 29 form a third reception circuit that transfers a reception signal of the communication band C from the antenna 2 through the antenna connection terminal 100.

Moreover, the switch 10, the filter 27, the switch 16, the matching circuit 36, the low noise amplifier 46, the switch 18, and the filter 29 form a fourth reception circuit that transfers a reception signal of the communication band D from the antenna 2 through the antenna connection terminal 100.

With the circuit configuration described above, the radio frequency module 1 can simultaneously receive a radio frequency signal of one out of the communication band A and the communication band B and a radio frequency signal of one out of the communication band C and the communication band D.

Note that in radio frequency modules according to preferred embodiments of the present disclosure, the four reception circuits described above do not have to be connected to the antenna connection terminal 100 with the switch 10 interposed therebetween and may also be connected to the antenna 2 through different terminals.

Moreover, it is sufficient that radio frequency modules according to preferred embodiments of the present disclosure include at least one of the four reception circuits described above.

Moreover, radio frequency modules according to preferred embodiments of the present disclosure may include a transmission circuit together with the reception circuits described above. The transmission circuit is a circuit that transfers a transmission signal, and has, for example, a power amplifier and a transmission filter.

Moreover, it is sufficient that radio frequency modules according to preferred embodiments of the present disclosure include the filter 29 and at least one of the low noise amplifiers 42 and 46.

At least one of the low noise amplifiers 42 and 46 and at least one of the switches 10, 16, and 18 may be formed in a semiconductor IC. The semiconductor IC is formed using, for example, CMOS. Specifically, the semiconductor IC is formed by an SOI process. This makes it possible to manufacture the semiconductor IC at low cost. Note that the semiconductor IC may include at least one out of GaAs, SiGe, and GaN. This makes it possible to output a radio frequency signal with which high-quality amplification performance and noise performance can be achieved.

The radio frequency module 1 according to the present embodiment includes the low noise amplifiers 42 and 46 and the filter 29, which is connected between the output terminal 120 of the low noise amplifier 42 and the reception output terminal 110 and between the output terminal 160 of the low noise amplifier 46 and the reception output terminal 110.

In the case of an existing reception amplification circuit, a filter for ensuring attenuation near the pass band is arranged before a low noise amplifier in order to suppress signal distortion at a low noise amplifier as much as possible. In this case, signal distortion is suppressed by the filter arranged before the low noise amplifier; however, it may be possible that the required performance indicated by a noise factor cannot be satisfied because of the filter.

Generally, in a case where a noise factor of a circuit element arranged before a low noise amplifier is denoted by $NF_1$, a noise factor of a circuit element arranged after the low noise amplifier is denoted by $NF_2$, and the gain of the low noise amplifier is denoted by G, a noise factor $NF_{all}$ of the entirety of a reception amplification circuit is expressed by the following Equation 1.

$$NF_{all}=NF_1+(NF_2-1)/G \quad (1)$$

In Equation 1, the noise factor $NF_2$ of the circuit element arranged after the low noise amplifier is divided by the gain G. Thus, in a case where the gain G of the low noise amplifier is greater than 1, the noise factor $NF_2$ affects the noise factor $NF_{all}$ to a lesser degree.

For example, in a case where both the circuit element having the noise factor $NF_1$ and the circuit element having the noise factor $NF_2$ are arranged before the low noise amplifier, the noise factor $NF_{all}$ determined by these noise factors is $(NF_1+NF_2)$. In contrast to this, in a case where the circuit element having the noise factor $NF_1$ is arranged before the low noise amplifier and the circuit element having the noise factor $NF_2$ is arranged after the low noise amplifier, the noise factor $NF_{all}$ determined by these noise factors is expressed by Equation 1. That is, in terms of noise factor reduction, it is beneficial to arrange a circuit element after the low noise amplifier on the premise that the circuit element arranged after the low noise amplifier is made to partially contribute to the necessary performance of the reception amplification circuit.

From the viewpoint described above, since the filter 29 is arranged after the low noise amplifiers 42 and 46 in the radio frequency module 1 according to the present embodiment, the noise factor can be reduced more greatly than in the existing reception amplification circuit in which the entire filter function is centralized before the low noise amplifier.

In the following, a structural arrangement of the radio frequency module 1 will be described, which realizes noise factor reduction.

2. Circuit-Element Structural Arrangement of Radio Frequency Module 1A According to Example 1

Figure 2A:
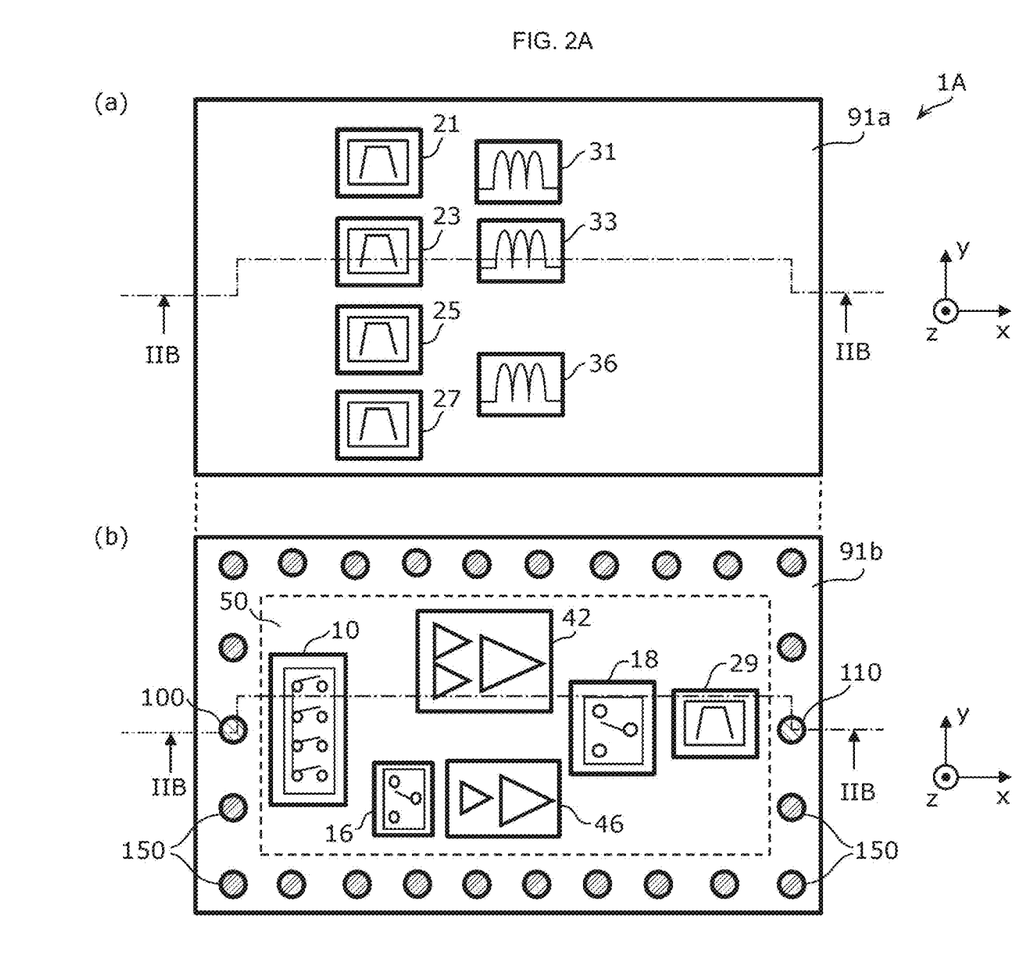
FIG. 2A is a schematic diagram of a planar structure of a radio frequency module according to Example 1.
Figure 2B:
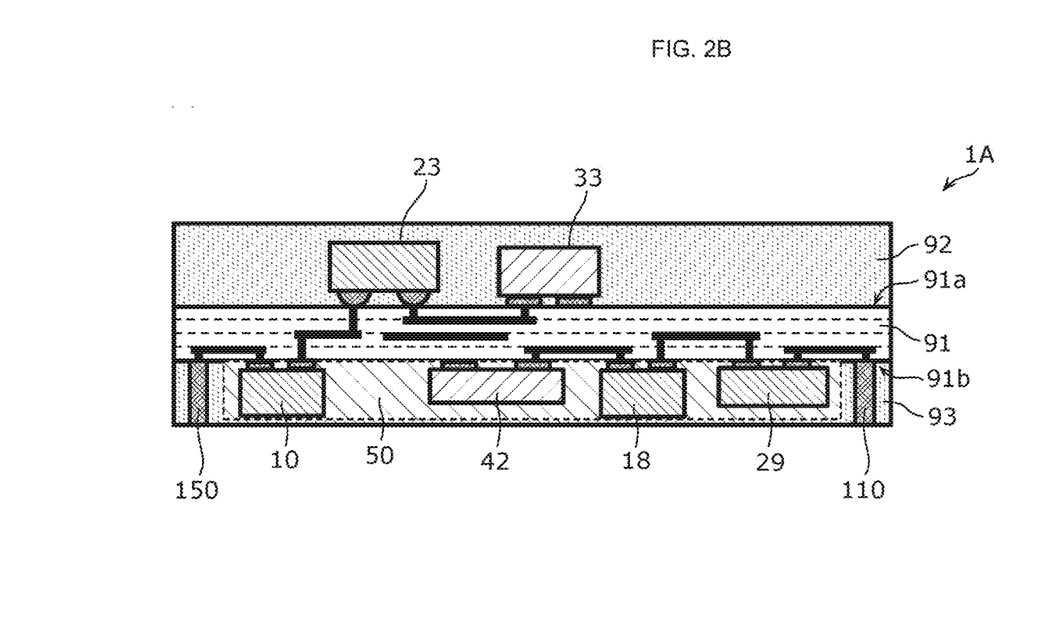
FIG. 2B is a schematic diagram of a sectional structure of the radio frequency module according to Example 1.

FIG. 2A is a schematic diagram of a planar structure of a radio frequency module 1A according to Example 1. FIG. 2B is a schematic diagram of a sectional structure of the radio frequency module 1A according to Example 1 and more specifically is a sectional view taken along line IIB-IIB in FIG. 2A. Note that part (a) of FIG. 2A illustrates a diagram of the arrangement of circuit elements in a case where out of main surfaces 91a and 91b, which are on opposite sides of the module board, of a module board 91, the main surface 91a is viewed from a z-axis plus direction side. In contrast, part (b) of FIG. 2A illustrates a perspective view of the arrangement of the circuit elements in a case where the main surface 91b is viewed from the z-axis plus direction side.

The radio frequency module 1A according to Example 1 specifically illustrates the structural arrangement of the circuit elements included in the radio frequency module 1 according to the embodiment.

As illustrated in FIGS. 2A and 2B, the radio frequency module 1A according to Example 1 further includes the module board 91, resin members 92 and 93, and a plurality of external connection terminals 150 in addition to the circuit configuration illustrated in FIG. 1.

The module board 91 has the main surface 91a (a first main surface) and the main surface 91b (a second main surface), which are on opposite sides of the module board, and is a board on which the reception circuits described above is mounted. As the module board 91, for example, a low temperature co-fired ceramic (LTCC) board, a high temperature co-fired ceramic (HTCC) board, a board with built-in components, a board having a redistribution layer (RDL), or a printed board is used, the above-described boards having a multilayer structure including a plurality of dielectric layers. Note that the antenna connection terminal 100 and the reception output terminal 110 may be formed on the module board 91.

The resin member 92 is arranged on the main surface 91a of the module board 91, covers a portion of the reception circuits described above and the main surface 91a of the module board 91, and has the function of ensuring the reliability of the circuit elements constituting the reception circuits described above such as mechanical strength and moisture resistance. The resin member 93 is arranged on the main surface 91b of the module board 91, covers a portion of the reception circuits described above and the main surface 91b of the module board 91, and has the function of ensuring the reliability of the circuit elements constituting the reception circuits described above such as mechanical strength and moisture resistance. Note that the resin members 92 and 93 are nonessential constitutional elements of radio frequency modules according to preferred embodiments of the present disclosure.

As illustrated in FIGS. 2A and 2B, in the radio frequency module 1A according to Example 1, the filters 21, 23, 25, and 27 and the matching circuits 31, 33, and 36 are arranged on the main surface 91a. In contrast, the low noise amplifiers 42 and 46, the filter 29, the switches 10, 16, and 18 are arranged on the main surface 91b.

Note that, although not illustrated in FIG. 2A, wiring lines for connection of the circuit elements illustrated in FIG. 1 are formed inside the module board 91 and on the main surfaces 91a and 91b. Moreover, the wiring lines described above may each be a bonding wire whose ends are joined to one out of the main surfaces 91a and 91b and the circuit elements constituting the radio frequency module 1A or may be terminals, electrodes, or wiring lines formed on surfaces of the circuit elements constituting the radio frequency module 1A.

The plurality of external connection terminals 150 are arranged on the main surface 91b of the module board 91. The radio frequency module 1A exchanges electrical signals with an external board arranged on a z-axis minus direction side of the radio frequency module 1A through the plurality of external connection terminals 150. As illustrated in part (b) of FIG. 2A, the plurality of external connection terminals 150 include the antenna connection terminal 100 and the reception output terminal 110. In addition, some of the plurality of external connection terminals 150 are set to a ground potential of the external board. The matching circuits 31, 33, and 36, which are difficult to reduce in height, are not arranged but the low noise amplifiers 42 and 46, which are easy to reduce in height, are arranged on the main surface 91b facing the external board out of the main surfaces 91a and 91b, thereby making it possible to reduce the height of the entire radio frequency module 1A.

Moreover, in the radio frequency module 1A according to Example 1, the filter 29 is arranged on the main surface 91b, and the low noise amplifiers 42 and 46, the switches 10, 16, and 18, and the filter 29 are included in one semiconductor IC 50. According to this, the switches 10, 16, and 18 and the filter 29, which are easy to reduce in height, can be formed as a unit together with the low noise amplifiers 42 and 46 on the main surface 91b, thereby helping to miniaturize the radio frequency module 1A.

Note that in a case where the filter 29 is included in the semiconductor IC 50, it is preferable that the filter 29 be not an acoustic wave filter but an LC filter. An LC filter includes at least one out of a chip-shaped inductor and a chip-shaped capacitor or at least one out of an inductor and a capacitor formed by a flat electrode pattern or a coil pattern formed on a dielectric member.

Moreover, in the radio frequency module 1A according to Example 1, in a case where the module board 91 is viewed in a plan view as illustrated in part (b) of FIG. 2A, the filter 29 is arranged between the low noise amplifier 42 and the reception output terminal 110 and between the low noise amplifier 46 and the reception output terminal 110.

In this arrangement, the order in which the low noise amplifiers 42 and 46, the filter 29, and the reception output terminal 110 are arranged corresponds to the flow of a reception signal. Thus, the length of wiring lines connecting these elements can be reduced, thereby reducing the transmission loss of the reception signal.

Moreover, in the radio frequency module 1A according to Example 1, the filter 29 is arranged on the main surface 91b, and the filters 21, 23, 25, and 27 are arranged on the main surface 91a.

That is, the filters 21, 23, 25, and 27 arranged before the low noise amplifiers 42 and 46 and the filter 29 arranged after the low noise amplifiers 42 and 46 are arranged in a distributed manner on both surfaces of the module board 91. This arrangement can suppress forming of an unnecessary feedback loop before and after the low noise amplifiers 42 and 46 due to electromagnetic coupling between the filters 21, 23, 25, and 27 and the filter 29 and suppress oscillation of an output signal from the low noise amplifiers 42 and 46.

Moreover, in the radio frequency module 1A according to Example 1, the filter 29 is arranged on the main surface 91b, and the matching circuits 31, 33, and 36 are arranged on the main surface 91a.

That is, the matching circuits 31, 33, and 36 arranged before the low noise amplifiers 42 and 46 and the filter 29 arranged after the low noise amplifiers 42 and 46 are arranged in a distributed manner on both surfaces of the module board 91. This arrangement can suppress forming of an unnecessary feedback loop before and after the low noise amplifiers 42 and 46 due to electromagnetic coupling between the matching circuits 31, 33, and 36 and the filter 29 and suppress oscillation of an output signal from the low noise amplifiers 42 and 46.

Note that it is desirable that the module board 91 have a multilayer structure in which a plurality of dielectric layers are stacked and a ground electrode pattern be formed on at least one of the plurality of dielectric layers. This improves the electromagnetic field shielding function of the module board 91.

3. Circuit-Element Structural Arrangement of Radio Frequency Module 1B According to Example 2

Figure 3A:
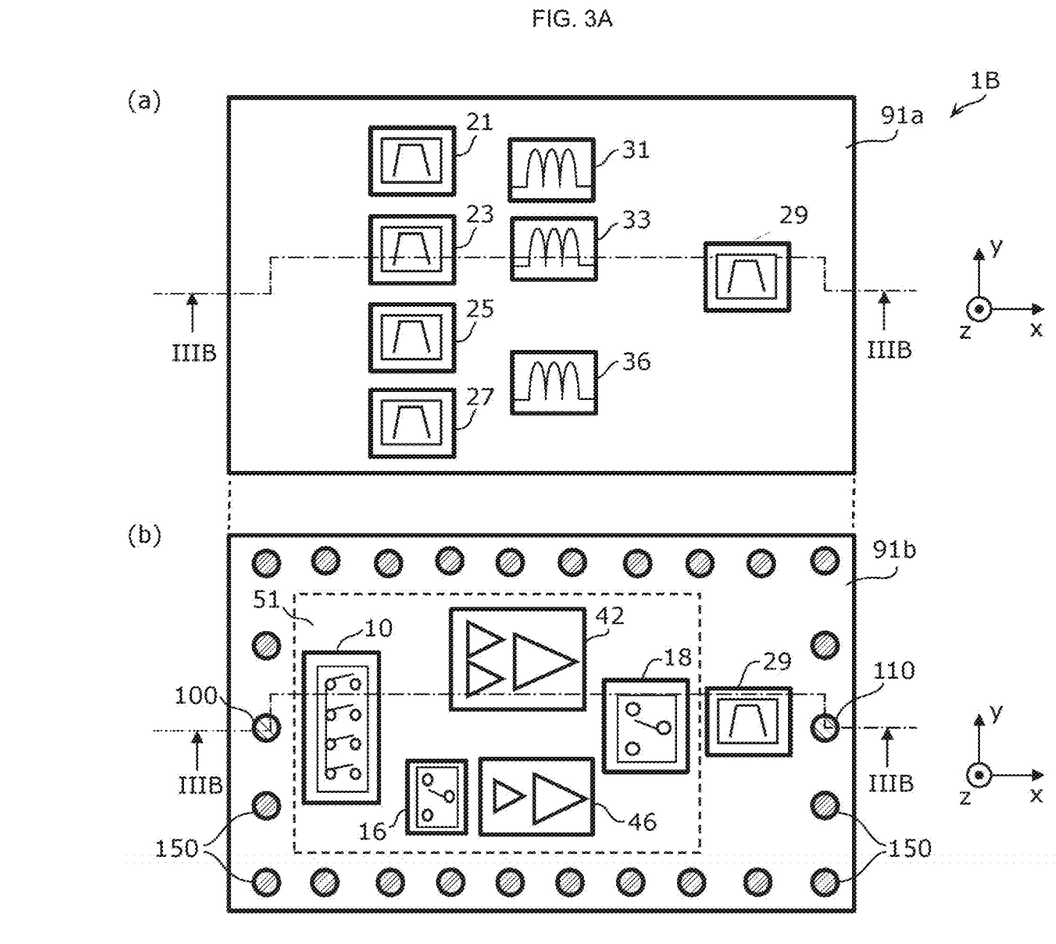
FIG. 3A is a schematic diagram of a planar structure of a radio frequency module according to Example 2.
Figure 3B:
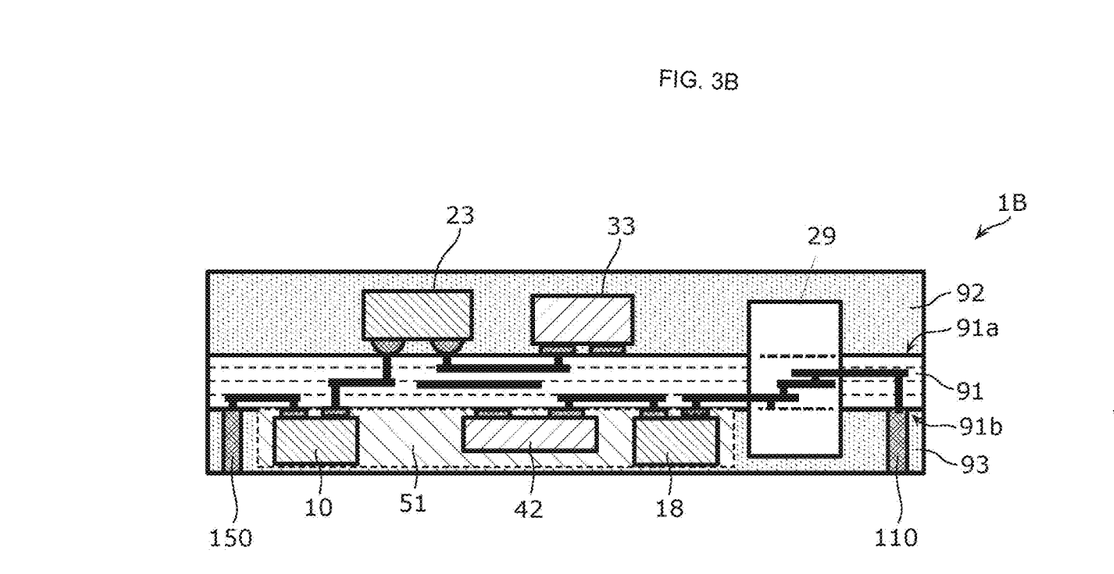
FIG. 3B is a schematic diagram of a sectional structure of the radio frequency module according to Example 2.

FIG. 3A is a schematic diagram of a planar structure of a radio frequency module 1B according to Example 2. FIG. 3B is a schematic diagram of a sectional structure of the radio frequency module 1B according to Example 2 and more specifically is a sectional view taken along line IIIB-IIIB in FIG. 3A. Note that part (a) of FIG. 3A illustrates a diagram of the arrangement of circuit elements in a case where the main surface 91a is viewed from the z-axis plus direction side out of the main surfaces 91a and 91b, which are on opposite sides of the module board, of the module board 91. In contrast, part (b) of FIG. 3A illustrates a perspective view of the arrangement of the circuit elements in a case where the main surface 91b is viewed from the z-axis plus direction side.

The radio frequency module 1B according to Example 2 specifically illustrates the structural arrangement of the circuit elements included in the radio frequency module 1 according to the embodiment.

When the radio frequency module 1B according to Example 2 is compared with the radio frequency module 1A according to Example 1, the structural arrangement of the circuit elements of the radio frequency module 1B differs from that of the radio frequency module 1A. In the following, regarding the radio frequency module 1B according to Example 2, the same points as those of the radio frequency module 1A according to Example 1 will be omitted and different points will be mainly described.

As illustrated in FIGS. 3A and 3B, in the radio frequency module 1B according to Example 2, the filters 21, 23, 25, and 27 and the matching circuits 31, 33, and 36 are arranged on the main surface 91a. In contrast, the low noise amplifiers 42 and 46 and the switches 10, 16, and 18 are arranged on the main surface 91b. Furthermore, the filter 29 is arranged so as to extend along at least one out of the main surfaces 91a and 91b and inside the module board 91.

Moreover, in the radio frequency module 1B according to Example 2, the low noise amplifiers 42 and 46 and the switches 10, 16, and 18 are included in one semiconductor IC 51. According to this, the switches 10, 16, and 18, which are easy to reduce in height, can be formed as a unit together with the low noise amplifiers 42 and 46 on the main surface 91b, thereby helping to miniaturize the radio frequency module 1B.

The filter 29 has an acoustic wave resonator arranged on at least one of the main surfaces 91a and 91b and has at least one out of an inductor and a capacitor formed by a flat electrode pattern or a coil pattern inside the module board 91.

With this configuration, the filter 29 can be arranged both on a surface of and inside the module board 91, thereby making it possible to miniaturize the radio frequency module 1B. Moreover, since the filter 29 can include an acoustic wave resonator, an inductor, and a capacitor, for example, the attenuation slope near the pass band can be made steeper by the acoustic wave resonator and a wide band away from the pass band can be attenuated by the inductor and the capacitor.

Moreover, in the radio frequency module 1B according to Example 2, in a case where the module board 91 is viewed in a plan view as illustrated in part (b) of FIG. 3A, the filter 29 is arranged between the low noise amplifier 42 and the reception output terminal 110 and between the low noise amplifier 46 and the reception output terminal 110.

In this arrangement, the order in which the low noise amplifiers 42 and 46, the filter 29, and the reception output terminal 110 are arranged corresponds to the flow of a reception signal. Thus, the length of wiring lines connecting these elements can be reduced, thereby reducing the transmission loss of the reception signal.

4. Advantageous Effects and so Forth

As described above, the radio frequency module 1 according to the present embodiment includes the antenna connection terminal 100, the reception output terminal 110, the low noise amplifier 42, and the filter 29, the low noise amplifier 42 being capable of amplifying a radio frequency reception signal input from the antenna connection terminal 100, the filter 29 being connected between the output terminal 120 of the low noise amplifier 42 and the reception output terminal 110 and having a pass band including the frequency of the radio frequency reception signal.

With this configuration, since the filter 29 is arranged after the low noise amplifier 42, the noise factor can be reduced more greatly than in the existing reception amplification circuit in which the entire filter function is centralized before a low noise amplifier.

In the radio frequency module 1, the low noise amplifier 42 includes a plurality of amplification elements that are cascade connected, and the filter 29 may be connected between an output terminal of an amplification element arranged in the last stage out of the plurality of amplification elements and the reception output terminal 110.

The radio frequency module 1 further includes the module board 91 having the main surfaces 91a and 91b, which are on opposite sides of the module board, and the plurality of external connection terminals 150 arranged on the main surface 91b, and the low noise amplifier 42 may be arranged on the main surface 91b.

In the radio frequency module 1A, the filter 29 may be arranged on the main surface 91b.

In the radio frequency module 1A, the filter 29 is an LC filter including at least one out of an inductor and a capacitor, and the filter 29 and the low noise amplifier 42 may be included in the one semiconductor IC 50.

In the radio frequency module 1B, the filter 29 may be arranged on at least one of the main surfaces 91a and 91b and inside the module board 91.

In the radio frequency module 1B, the filter 29 may have an acoustic wave resonator arranged so as to extend along at least one out of the main surfaces 91a and 91b and at least one out of an inductor and a capacitor formed inside the module board 91.

With this configuration, the filter 29 can be arranged both on a surface of and inside the module board 91, thereby making it possible to miniaturize the radio frequency module 1B. Moreover, since the filter 29 can include an acoustic wave resonator, an inductor, and a capacitor, for example, the attenuation slope near the pass band can be made steeper by the acoustic wave resonator and a wide band away from the pass band can be attenuated by the inductor and the capacitor.

In the radio frequency module 1, the reception output terminal 110 is one of the plurality of external connection terminals 150. In a case where the module board 91 is viewed in a plan view, the filter 29 may be arranged between the low noise amplifier 42 and the reception output terminal 110.

In this arrangement, the order in which the low noise amplifier 42, the filter 29, and the reception output terminal 110 are arranged corresponds to the flow of a reception signal. Thus, the length of wiring lines connecting these elements can be reduced, thereby reducing the transmission loss of the reception signal.

The radio frequency module 1 may further include the filter 21, which is connected between the antenna connection terminal 100 and the input terminal 121 of the low noise amplifier 42 and has a pass band including the frequency of a radio frequency reception signal.

With this configuration, signal distortion caused at the low noise amplifier 42 can be suppressed.

In the radio frequency module 1, out of the main surfaces 91a and 91b, the filter 21 may be arranged on the main surface different from the main surface where the filter 29 is arranged.

This arrangement can suppress forming of an unnecessary feedback loop before and after the low noise amplifier 42 due to electromagnetic coupling between the filter 21 and the filter 29 and suppress oscillation of an output signal from the low noise amplifier 42.

The radio frequency module 1 may further include the matching circuit 31, which is connected between the filter 21 and the input terminal 121 of the low noise amplifier 42 and achieves impedance matching between the filter 21 and the low noise amplifier 42.

In the radio frequency module 1, out of the main surfaces 91a and 91b, the matching circuit 31 may be arranged on the main surface different from the main surface where the filter 29 is arranged.

This arrangement can suppress forming of an unnecessary feedback loop before and after the low noise amplifier 42 due to electromagnetic coupling between the matching circuit 31 and the filter 29 and suppress oscillation of an output signal from the low noise amplifier 42.

The communication device 4 includes the antenna 2, the RFIC 3, which processes a radio frequency signal received by the antenna 2, and the radio frequency module 1, which transfers a radio frequency signal between the antenna 2 and the RFIC 3.

Thus, the communication device 4 can be provided, which includes a reception amplification circuit having a favorable noise factor.

Other Embodiments and so Forth

The radio frequency modules and communication device according to embodiments of the present disclosure have been described above taking for example the embodiment and Examples 1 and 2; however, the radio frequency modules and communication device according to the present disclosure are not limited to the above-described embodiment and Examples 1 and 2. The present disclosure also includes other embodiments realized by combining arbitrary structural elements in the above-described embodiment and Examples 1 and 2, modifications obtained by adding, to the embodiment and Examples 1 and 2 described above, various types of changes that can be conceived by those skilled in the art within the scope not departing from the gist of the present disclosure, and various types of devices including the above-described radio frequency modules and communication device.

For example, in the radio frequency modules and communication device according to the embodiment and Examples 1 and 2 described above, other circuit elements and wiring lines and so forth may be inserted midway along paths that connect the circuit elements and signal paths disclosed in the drawings.

In communication devices such as portable phones, preferred embodiments of the present disclosure can be widely used as a radio frequency module including a reception amplification circuit for which a low noise factor is desired.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio frequency module comprising:
a signal input terminal;
a signal output terminal;
a low noise amplifier configured to amplify a radio frequency reception signal input from the signal input terminal;
a first filter connected between an output terminal of the low noise amplifier and the signal output terminal and having a pass band including a frequency of the radio frequency reception signal;
a module board that has a first main surface and a second main surface, which are on opposite sides of the module board; and
a plurality of external connection terminals arranged on the second main surface, wherein
the low noise amplifier is arranged on the second main surface, and
the first filter is arranged so as to extend along at least one of the first main surface and the second main surface and inside the module board.

2. The radio frequency module of claim 1, wherein the low noise amplifier includes a plurality of amplification elements that are cascade connected.

3. The radio frequency module of claim 2, wherein the first filter is connected between an output terminal of an amplification element arranged in a last stage out of the plurality of amplification elements and the signal output terminal.

4. The radio frequency module of claim 1, wherein the first filter is arranged on the second main surface.

5. The radio frequency module of claim 4, wherein the first filter is an inductance-capacitance filter including at least one out of an inductor and a capacitor, and the first filter and the low noise amplifier are included in one semiconductor integrated circuit.

6. The radio frequency module of claim 1, wherein the first filter includes
an acoustic wave resonator arranged on at least one of the first main surface and the second main surface, and
at least one of an inductor and a capacitor formed inside the module board.

7. The radio frequency module of claim 1, wherein the signal output terminal is one of the plurality of external connection terminals.

8. The radio frequency module of claim 7, wherein in a case where the module board is viewed in a plan view, the first filter is arranged between the low noise amplifier and the signal output terminal.

9. The radio frequency module of claim 1, further comprising:
a second filter connected between the signal input terminal and an input terminal of the low noise amplifier and having a pass band including a frequency of the radio frequency reception signal.

10. The radio frequency module of claim 9, wherein of the first main surface and the second main surface, the second filter is arranged on a main surface different from a main surface where the first filter is arranged.

11. The radio frequency module of claim 9, further comprising:
a matching circuit connected between the second filter and the input terminal of the low noise amplifier and configured to perform impedance matching between the second filter and the low noise amplifier.

12. The radio frequency module of claim 11, wherein of the first main surface and the second main surface, the matching circuit is arranged on the main surface different from the main surface where the first filter is arranged.

13. A communication device comprising:
an antenna;
a radio frequency signal processing circuit that processes a radio frequency signal received by the antenna; and
a radio frequency module configured to transfer the radio frequency signal between the antenna and the radio frequency signal processing circuit, wherein
the radio frequency module includes
a signal input terminal;
a signal output terminal;
a low noise amplifier configured to amplify a radio frequency reception signal input from the signal input terminal;
a first filter connected between an output terminal of the low noise amplifier and the signal output terminal and having a pass band including a frequency of the radio frequency reception signal;
a module board that has a first main surface and a second main surface, which are on opposite sides of the module board; and
a plurality of external connection terminals arranged on the second main surface, wherein
the low noise amplifier is arranged on the second main surface, and
the first filter is arranged so as to extend along at least one of the first main surface and the second main surface and inside the module board.

14. A radio frequency module comprising:
a module board that has a first main surface and a second main surface, which are on opposite sides of the module board;
a plurality of external connection terminals arranged on the second main surface;
a low noise amplifier disposed on the second main surface, wherein the low noise amplifier includes a plurality of amplification elements that are cascade connected and is configured to amplify a radio frequency reception signal input from a signal input terminal; and
a first filter disposed on the second main surface, wherein the first filter is connected between an output terminal of the low noise amplifier and a signal output terminal and has a pass band including a frequency of the radio frequency reception signal, wherein
the first filter is arranged so as to extend along at least one of the first main surface and the second main surface and inside the module board.

15. The radio frequency module of claim 14, wherein
the first filter is connected between an output terminal of
an amplification element arranged in a last stage out of
the plurality of amplification elements and the signal
output terminal.

16. The radio frequency module of claim 14, wherein
the first filter is an inductance-capacitance filter including
at least one out of an inductor and a capacitor, and
the first filter and the low noise amplifier are included in
one semiconductor integrated circuit.

\* \* \* \* \*